Patented Nov. 15, 1927.

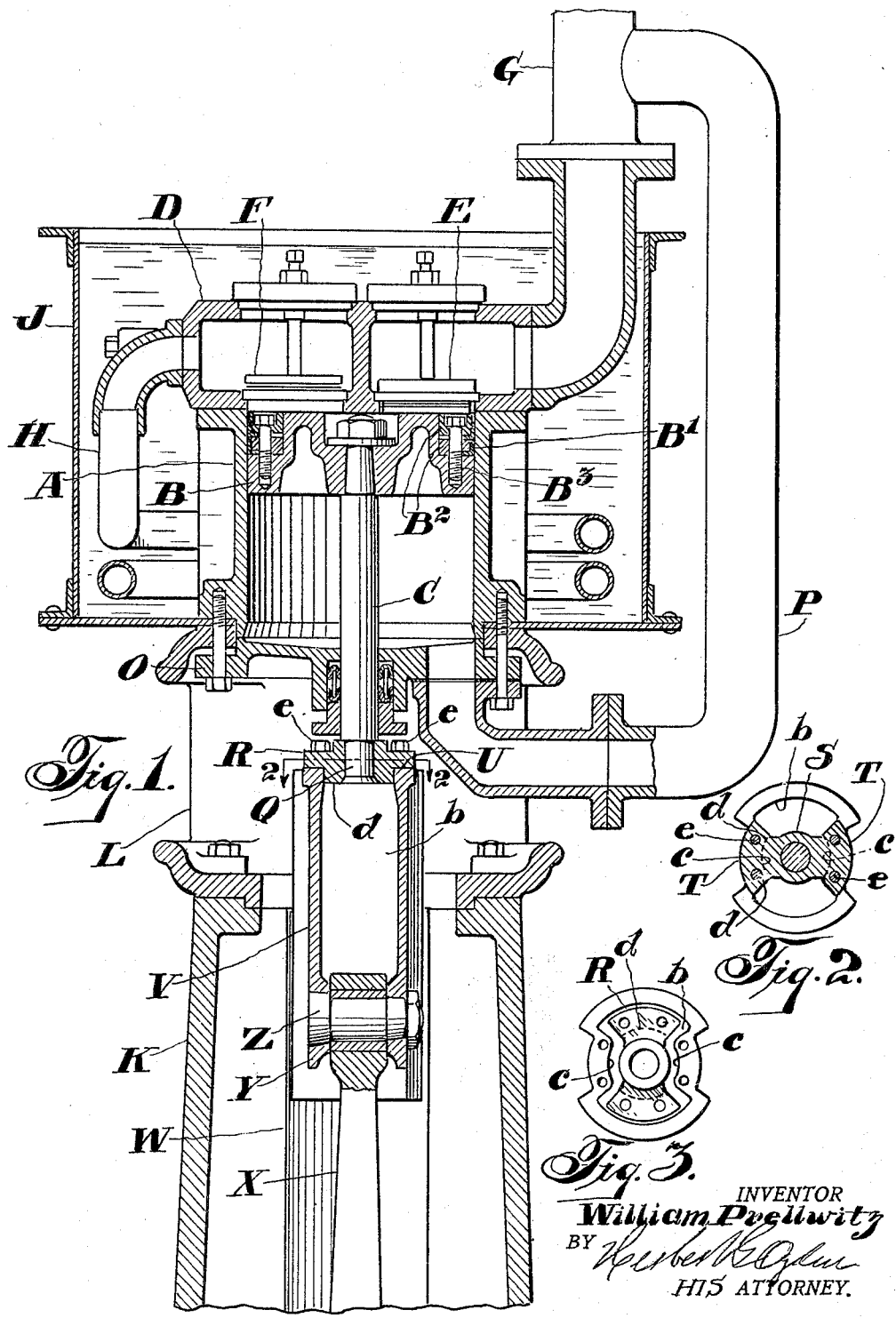

1,649,076

UNITED STATES PATENT OFFICE.

WILLIAM PRELLWITZ, OF EASTON, PENNSYLVANIA, ASSIGNOR TO INGERSOLL-RAND COMPANY, OF JERSEY CITY, NEW JERSEY, A CORPORATION OF NEW JERSEY.

COMPRESSOR.

Application filed June 25, 1927. Serial No. 201,490.

This invention relates to compressors, but more particularly to a connection between the piston and the cross head of compressors and other similar machines in which it is essential to occasionally remove the piston from the cylinder for purposes of inspection and replacement of piston rings, cup leathers, and other similar packing devices employed for maintaining a seal between the piston and the cylinder.

The object of the invention is to enable the piston to be removed from the cylinder without disturbing the general assembly of the machine.

Other objects will be in part obvious and in part pointed out hereinafter.

The invention consists of the combination of elements and arrangement of parts having the general mode of operation substantially as hereinafter described and claimed and illustrated in the accompanying drawings, in which Figure 1 is a sectional elevation of a portion of a compressor having the invention applied thereto, Figure 2 is a transverse view taken through Figure 1 on the line 2—2 looking in the direction indicated by the arrows, and Figure 3 is an end view of the cross head and the piston rod flange illustrating the manner in which the flange may be inserted into the cross head.

Referring more particularly to the drawings, A designates a compressor cylinder provided with a piston B to which is rigidly secured a piston rod C. The piston B is in this instance provided with cup leathers B' to maintain a seal between the piston and the walls of the cylinder A. The cup leathers B' may be secured in position in any suitable manner, as for instance, by clamping rings B² held in position by means of bolts B³.

Mounted on the cylinder A is a head D in which are disposed the usual inlet valves E and discharge valves F for controlling the admission and exhaust fluid into and from the cylinder A. Fluid, such as oxygen, intended to be compressed to a higher pressure is conveyed to the inlet valve F through a suction connection G leading from a source of supply (not shown). Upon the eduction of the compressed gas from the cylinder into the head D, such gas passes through a coil H encircling the cylinder A and submerged in cooling liquid contained in a tank J disposed about the cylinder A and the head D. After the compressed gas has been passed through a suitable number of coils to dissipate the heat of compression, such gas may be conveyed to a receiver tank of any suitable type (not shown).

As will be observed, the compressor illustrated is of the vertical type and the elements so far described are supported by a bed plate K between which and the cylinder A is interposed a distance piece L which may be secured to the bed plate K and the cylinder A in any suitable manner.

In the present instance the lowermost end of the cylinder A is provided with a bottom cover O having a central aperture through which the piston rod C may reciprocate. From the bottom cover O leads a breather pipe P to afford communication between the lowermost end of the cylinder A and the suction connection G.

In accordance with the present invention the end Q of the piston rod C which extends exterior of the cylinder A is reduced somewhat in diameter below that of the body portion of the rod C for the reception of a flange R which may be either press fitted or shrunk on the end Q of the rod. The flange R in this instance comprises a central hub portion S having diametrically opposed wings T which, in the assembled position of the flange, are adapted to seat on the end surface U of a cross head V slidable on guides W in the bed plate K. A connecting rod X, through which motion from a propelling element (not shown) is transmitted to the cross head, is in this instance connected to the lowermost end Y of the cross head by means of a suitable wrist pin Z.

The cross head V has a recess $b$ of considerable depth and of substantially oblong cross sectional form, that is, the recess is of such shape that when the flange R is turned a partial revolution from its normal assembled position, said flange may pass freely into the recess $b$. A portion of the outer end of the recess $b$ is bored as at $c$ to receive a projection $d$ carried by the flange R for centralizing the said flange and, consequently, the piston rod C with respect to the cross head V. Any suitable means may be provided for securing the flange to the seat U on the cross head V; in the drawings, bolts e are indicated for this purpose.

In practice, whenever it is desired to remove the piston for the purpose of inspecting the cup leathers B' or for replacing same, the bolts e may be removed from the flange R in the cross head, and the flange, together with the rod C and the piston B, may then be turned a partial revolution, approximately a quarter turn in the present instance, to the position indicated in Figure 3. In this position, it will be observed, the flange R may be inserted freely into the recess b a sufficient distance to permit the piston B to be withdrawn from the cylinder A, it being understood that the bottom cover O will, of course, also have been removed from the cylinder. In this way the piston B may be entirely removed from the cylinder and the cup leathers B' may be inspected, or replaced if need be, without necessitating the disassembling of those elements of the compressor supported by the bed plate K. After replacement of the cup leathers B', the various elements removed to gain access to the piston may again be replaced in their respective positions. All of which may be accomplished with a minimum loss of time.

I claim:

1. In a compressor, the combination of a cylinder and a piston, a rod carried by the piston, a cross head having a recess, and a flange on the rod adapted to be secured on the end of the cross head in one position, said flange being rotatable to another position to permit insertion of the flange and the rod into the recess during the removal of the piston from the cylinder.

2. In a compressor, the combination of a cylinder and a piston, a rod secured to the piston, a cross head having a recess, a flange on the rod seated on the end of the cross head, said flange being adapted to enter the recess, thus permitting removal of the piston from the cylinder, means on the flange cooperating with the recess for centralizing the flange with respect to the cross head, and means for securing the flange to the cross head.

In testimony whereof I have signed this specification.

WILLIAM PRELLWITZ.